US008028085B2

(12) United States Patent
Elien et al.

(10) Patent No.: US 8,028,085 B2
(45) Date of Patent: Sep. 27, 2011

(54) OPTIMIZING MESSAGE TRANSMISSION AND DELIVERY IN A PUBLISHER-SUBSCRIBER MODEL

(75) Inventors: Jean-Emile Elien, Bellevue, WA (US); Lee B. Graber, Kirkland, WA (US); Sanjib Saha, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1274 days.

(21) Appl. No.: 11/144,102

(22) Filed: Jun. 3, 2005

(65) Prior Publication Data
US 2006/0277319 A1    Dec. 7, 2006

(51) Int. Cl.
G06F 15/173 (2006.01)
(52) U.S. Cl. ........................................ 709/238
(58) Field of Classification Search .................. 709/204, 709/217, 238, 216
See application file for complete search history.

(56) References Cited

U.S. PATENT DOCUMENTS

| | | | |
|---|---|---|---|
| 5,870,605 A * | 2/1999 | Bracho et al. ................. | 719/318 |
| 6,405,266 B1 * | 6/2002 | Bass et al. ..................... | 719/328 |
| 6,510,429 B1 * | 1/2003 | Todd ............................ | 705/36 R |
| 2003/0167352 A1 * | 9/2003 | Hoshiai et al. ................ | 709/318 |
| 2004/0153998 A1 * | 8/2004 | McGuire et al. .............. | 717/128 |
| 2004/0267784 A1 * | 12/2004 | Byng ............................. | 707/100 |
| 2005/0021622 A1 * | 1/2005 | Cullen .......................... | 709/204 |
| 2005/0278410 A1 * | 12/2005 | Espino ......................... | 709/201 |
| 2006/0200444 A1 * | 9/2006 | Bracho et al. .................... | 707/1 |
| 2008/0155140 A1 * | 6/2008 | Mathrubutham et al. ....... | 710/52 |

* cited by examiner

Primary Examiner — Jeffrey Pwu
Assistant Examiner — Scott Sciacca
(74) Attorney, Agent, or Firm — Woodcock Washburn LLP

(57) ABSTRACT

Systems and methods for reducing the latency incurred during the publication of a message in a message publication system are provided. In a message publication system wherein the publishing component and the receiving component are located within the same processing space, several of the latency components that are usually unavoidably incurred may be eliminated. In such a system, the messaging queue is not used as a medium between the two components but is instead used as a secondary back-up storage. This results in the elimination of one latency component as the message is directly published from the publishing component to the receiving component. Further time reductions or optimizations occur when the durability, or reliability, of the message publication is not a concern and the messaging queue can be completely disregarded. Yet another optimization occurs when the identity of the subscriber is known in advance by the publisher.

20 Claims, 6 Drawing Sheets

OPTIMIZING MESSAGE TRANSMISSION AND DELIVERY IN A PUBLISHER-SUBSCRIBER MODEL

BACKGROUND

The interaction between a publisher and a subscriber is a necessary feature in a message publication environment. In such an environment, a publisher routes messages to a subscriber through a persistent and dynamic storage center. This center, which may be thought of as a message data store, a subscription store, and a middle man between the two components, incorporates a designated storage queue for each subscriber of the system.

In a typical message publication environment, when the publisher possesses a message to be published, a publishing component contacts the subscription store to identify the potential subscribers to receive the message. Once a list of subscribers for the message to be published is obtained, the message is pushed into the designated queue of each subscriber. In order for each subscriber to receive the message, a polling mechanism is employed. Specifically, a message receiving component pulls the message from the storage queues and delivers the message to each subscriber. After the message has been received and processed by a subscriber, it is removed from that subscriber's storage queue.

The message delivery process outlined above incurs several latencies throughout the course of evaluating, sending, delivering, and removing a message. Time Te is the evaluation time and occurs at the beginning of the process after the publication interface has been provided with a message to be published. Te is the amount of time necessary to consult the subscription store in order to review and obtain a list of subscribers who can receive the message. The next encountered latency is time Tq, the queue time that is required to push the message to the queue of each subscriber identified on the subscriber list. Tp, the poll time, is the latency incurred when the receiving component polls the subscriber's queue and takes the message out to be published and processed. An additional latency component in the message delivery process, Tc, the clean-up time, occurs during the clean-up process in which the message is removed from the subscriber's queue. This latency occurs after the message has safely been polled to the subscriber and the subscriber has completely processed the message.

Generally, the latency components discussed above are not desirable. Accordingly, there is a need for systems and methods that reduce, or even eliminate entirely, one or more of the latency components involved in the transmission and publication of a message in a publisher-subscriber model. The present invention satisfies this need.

SUMMARY OF THE INVENTION

The present invention is directed to a system and method for reducing the latencies associated with the publication of a message to subscribers in a message publication system that implements a publisher-subscriber model. Such a system typically comprises a publishing component, a subscription and message store, and one or more receiving components each associated with one or more subscribers. The subscription and message store typically comprises a number of message queues each corresponding to one of the subscribers to the system. When the publishing component receives a message to be published, the publishing component normally determines from the subscription store which subscribers are to receive the message and then stores a copy of the message in the message queues of each of those subscribers. Each receiving component typically polls the message queues of each of the subscribers for which it is responsible to determine whether any new messages have been placed in any of those message queues. When a new message is detected in the message queue of a subscriber, the receiving component retrieves the message from the message queue and delivers it to the subscriber. Typically, the message is retained in the message queue but is marked to indicate that the receiving component has retrieved the message and delivered it to the subscriber.

According to the present invention, the conventional message publication process is improved for subscribers whose receiving components reside in the same process space as the publishing component by reducing the latencies normally associated with message publication in such a system. In particular, after receiving a message to be published and identifying a subscriber to which the message is to be published, where that subscriber's receiving component resides in the same process space as the publishing component, the message is instead transferred directly from the publishing component to the receiving component without requiring that the receiving component retrieve it from a message queue associated with the subscriber.

In one embodiment, the subscription and message store is bypassed altogether, in which case the durability of the message is not preserved. In another embodiment, the durability of the message is maintained by storing it in the message queue associated with the subscriber, even though it has also been published directly to the receiving component. In that embodiment, while adding the message to the subscriber's queue, the message is marked in the message queue as if it had been retrieved from the queue by the receiving component.

In other embodiments, in which the identity of each subscriber to which a message is to be published is already known, the conventional step of accessing the subscription store to identify the subscribers to which a message is to be published can also be eliminated, resulting in a further optimization of the message delivery process.

Other advantages and features of the invention are described below.

BRIEF DESCRIPTION OF THE DRAWINGS

The foregoing summary and the following detailed description of the invention are better understood when read in conjunction with the appended drawings. Exemplary embodiments of the invention are shown in the drawings, however it is understood that the invention is not limited to the specific methods and instrumentalities depicted therein. In the drawings.

DETAILED DESCRIPTION OF THE INVENTION

Figure 1:
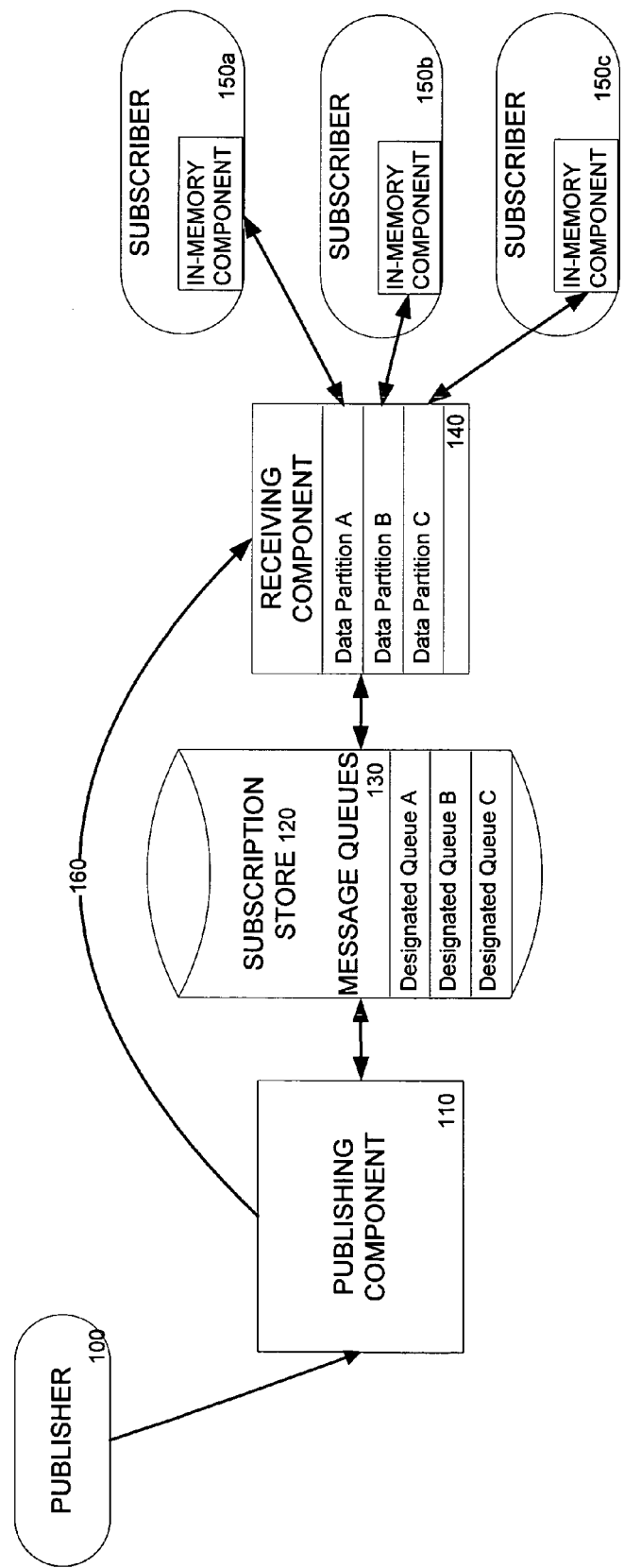
FIG. 1 is a block diagram illustrating the publication of a message according to the present invention.

FIG. 1 is a block diagram illustrating the components of a conventional message publication system based on the publisher-subscriber model. In this model, a publisher 100 may publish messages to one or more subscribers 150a, 150b . . . 150c. The publisher 100 communicates with the system through a publishing component 110, while the subscribers 150a, 150b . . . 150c communicate through an associated receiving component 140. There may be multiple receiving components (not shown) in the system, each associated with and responsible for a different group of subscribers. The subscription and message store 120 serves as a communication medium between the publishing component 110 and the receiving component 140.

Typically, the subscription and message store 120 is a dynamic and persistent data store (e.g., a database) that maintains information regarding potential subscribers and the message types that each subscriber, such as subscribers 150a, 150b . . . 150c, is interested in receiving. It may contain a number of message queues 130, each associated with a different subscriber. Generally, there is one message queue for each subscriber. For example, as shown in FIG. 1, there are three queues for three different subscribers—Designated Queue A, Designated Queue B, and Designated Queue C. It is understood, however, that the present invention is not limited to any particular number of subscribers and corresponding message queues. An example of such a system is a document collaboration system where users may subscribe to receive specific types of documents of their choosing. When a new document is made available, all of the subscribers that have indicated interest in this type of document are notified and the new document is published to the subscribers.

In a conventional publisher-subscriber message publication system, when the publisher 100 has a message to be published, it posts the message to the publishing component 110 via an application programming interface (API) exposed by the publishing component. The publishing component 110 will then determine from information in the subscription store which subscribers should receive the message. For example, the subscription store may maintain information about each subscriber and the types of messages to which the subscriber has subscribed. Once the subscribers to which the message is to be published have been determined, the publishing component will store a copy of the message in the respective message queues of each subscriber.

Each receiving component, such as receiving component 140, typically polls the message queues of each of the subscribers for which it is responsible to determine whether any new messages have been placed in any of those message queues. When a new message is detected in the message queue of a subscriber, the receiving component retrieves the message from the message queue and delivers it to an in-memory component of the subscriber. Typically, the message is retained in the message queue but is marked, for example by setting a flag in the message queue structure, to indicate that the receiving component has retrieved the message and published it to the subscriber. The marking process is necessary in that it allows the receiving component to only retrieve and publish each message once by indicating the messages that have previously been retrieved and published.

A receiving component 140 typically services multiple subscribers. In one embodiment, this is achieved by establishing within the receiving component a plurality of data partitions. Generally, there is one data partition for each subscriber. For example, in the system illustrated in FIG. 1, there are three data partitions—Data Partition A, Data Partition B, and Data Partition C—one for each of the subscribers 150a, 150b and 150c. Again, however, it is understood that the present invention is not limited to any particular number of subscribers and corresponding data partitions.

As used herein, the term "publisher" generally refers to any component, part or portion of a system that functions to transmit or otherwise send a message to another component, part or portion of the system. The term "subscriber" generally refers to any component, part or portion of a system that functions to receive a message. The terms "publish," "publishing," "publication" and variations thereof refer generally to the process of transmitting, sending, delivering or otherwise providing a message to one or more subscribers. The term "publishing component" generally refers to program code, in the form of a component, program, module, object, routine, procedure or otherwise, that when executed is capable of receiving a message to be published and determining which subscribers should receive the message. The term "receiving component" generally refers to program code, in the form of a component, program, module, object, routine, procedure or otherwise, that when executed is capable of receiving a message intended for a subscriber, by retrieving it from a data store or otherwise, and delivering it to the subscriber.

As discussed in the Background section, several latencies occur in a conventional publisher-subscriber model. For example, time Te is the amount of time necessary to consult the subscription store in order to review and obtain a list of subscribers to which the message of interest should be published. Time Tq is the time required to push the message to the queue of each subscriber identified on the subscriber list. Tp is the latency incurred when the receiving component polls the subscriber's queue and takes the message out to be published to and processed by the subscriber, and Tc is the latency that occurs during the clean-up process in which the message is removed from a subscriber's queue.

Another feature of the traditional publisher-subscriber model discussed above is that the durability of a message is generally guaranteed. Message durability refers to the reliability of the message being published. A non-durable message is one in which the message can afford to be lost, and a durable message is one in which the message, once published, must be received by all of the indicated subscribers. For the publication of a durable message, certain measures are taken to ensure the message will not be lost and will be received by the subscriber. These measures exist in the traditional model where messages are routed through the message queues. And it is these measures that result in the latencies Tq, Tp, and Tc.

The inventors have recognized that certain of the latencies typically experienced in a conventional message publication system can be reduced or eliminated when both the publishing component and the receiving component for a particular subscriber(s) reside in the same process space on a computer system in which the message publication system is executing. In such a case, the inventors have recognized that a message may be transferred directly from the publishing component 110 to the receiving component 140 as illustrated by line 160 in FIG. 1. The inventors have also recognized that further optimizations can be achieved when the durability of a message is not required and when the subscribers to which a message should be published are predetermined.

FIGS. 2-5 are flowcharts illustrating different embodiments of a method for reducing the latencies associated with the publication of a message in a publisher-subscriber based message publication system in accordance with the present invention.

Figure 2:
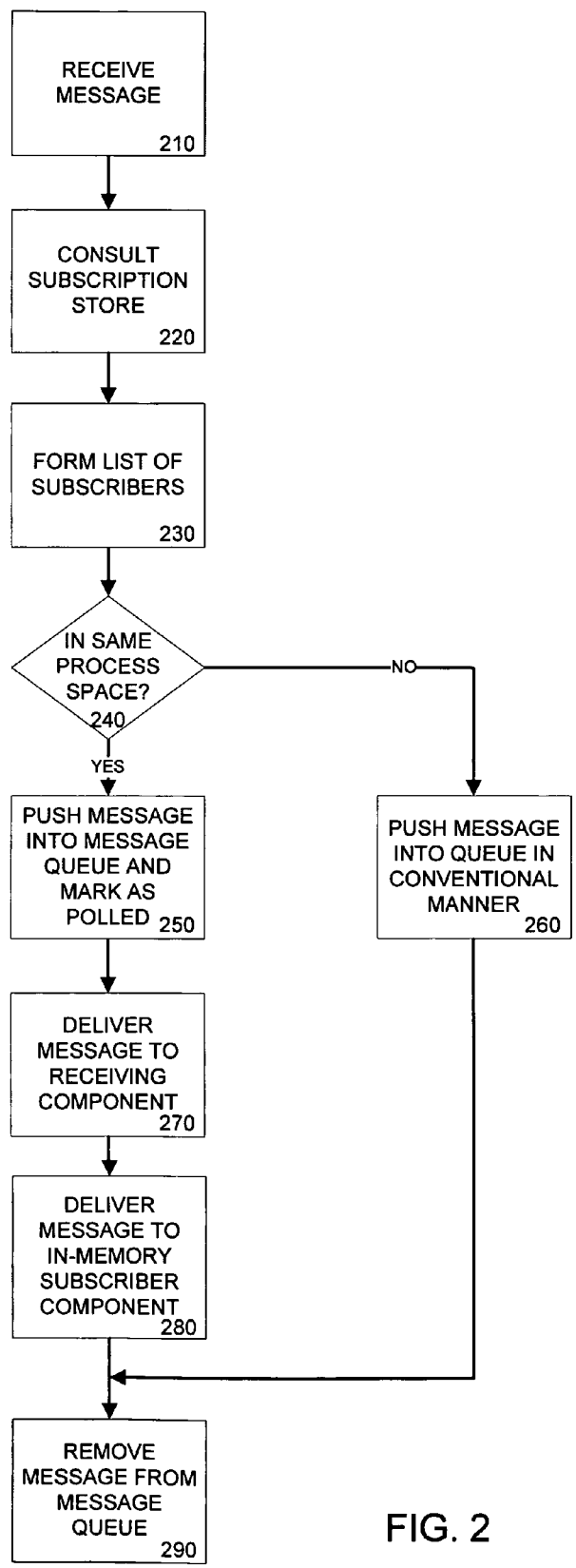
FIG. 2 is a flow diagram illustrating one embodiment of a method for reducing latency in a publisher-subscriber model in accordance with the present invention.

FIG. 2 is a flow diagram illustrating one embodiment of a method for reducing the latencies in the publication of a message in a message publication system in accordance with the present invention. It is assumed in this embodiment that durability of the message is still desired. The method illustrated in FIG. 2 may be employed when the publishing component 110 and the receiving component 140 of at least one subscriber 150 reside within the same process space. Generally, a process is an application program that contains one or more execution threads sharing resources, such as memory and synchronization objects, wherein the resources are allocated to the process by the operating system. A receiving component and a publishing component may generally consist of the data-structures and execution threads that are necessary to perform the individual tasks of the respective components. The components may reside within the same process space. Generally, when the publishing component and the receiving component reside within the same process space, they are able to communicate through intra-process application program interface (API) calls or through common data-structure updates that are accessible to both the components by virtue of being in the same process space.

Referring to FIG. 2, at step 210, the publishing component 110 receives a message from publisher 100 to be published to one or more subscribers (e.g., subscribers 150a, 150b ... 150c). At step 220, the publishing component 110 accesses the subscription store 120 in order to determine the subscribers to which the message should be published. At step 230, the publishing component 110 forms a list of subscribers to which the message should be published. At step 240, in accordance with the invention, the publishing component 110 determines, for each intended subscriber, whether the receiving component associated with that subscriber is in the same process space as the publishing component. If not, then at step 260, the message is pushed into the message queue 130 for that subscriber in the subscription store 120 in the conventional manner. The new message will be detected during the polling process performed by the receiving component, and ultimately will be published to the in-memory subscriber component.

If, however, it is determined at step 240 that the receiving component of the subscriber is in the same process space, then at step 250 the message is pushed into the corresponding message queue for the subscriber. But in this case, the message is marked in the queue as if it has already been discovered during the polling process of the receiving component, retrieved from the queue, and published to the in-memory component of the subscriber (even though this has actually not occurred). Such marking is accomplished in whatever manner messages are normally marked as such in the message queues. For example, the message queue structure in the subscription store may include a flag for each message that can be set for this purpose. Thus, it is made to appear in the subscription store that the message was already retrieved and delivered to the subscriber. Next, at step 270, the message is then delivered directly to the receiving component associated with the subscriber. In one embodiment, where the receiving component comprises multiple data partitions, one for each of the subscribers that it services, the message will be delivered directly to the data partition corresponding to the subscriber. A variety of means may be used to deliver the message to the receiving component in the same process space, and the present invention is by no means limited to any one mechanism. For example, the delivery can be achieved by passing the message to the receiving component via an inter-process communication mechanism, via an application programming interface call (such as a public method call), or by directly updating the in-memory data-structure of the receiving component. At step 280, the receiving component then publishes the message to an in-memory component of the subscriber in a conventional manner.

As can be appreciated, when the publishing component and receiving component reside in the same process space, this method avoids the usual latency Tp by delivering the message directly to the receiving component. The subscriber does not have to wait for the receiving component to discover the message during its polling process and to then deliver it to the subscriber. Yet, because the message is still pushed to the message queue for the subscriber, the durability of the message is maintained.

Whether the message is published in the conventional manner or via the more direct delivery method of the present invention, the message will eventually be removed from the message queue at step 290 in accordance with the conventional message clean-up process.

Figure 3:
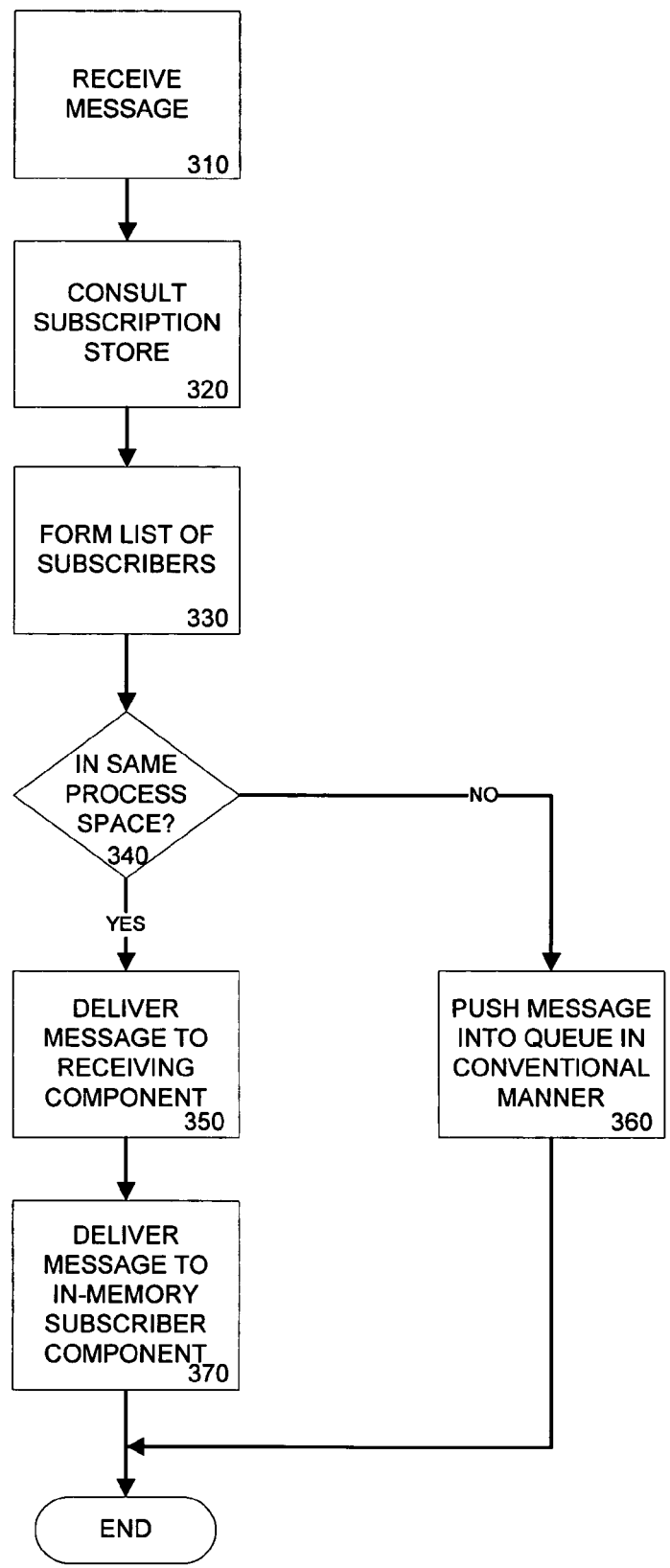
FIG. 3 is a flow diagram illustrating another embodiment of a method for reducing latency in a publisher-subscriber model in accordance with the present invention.

FIG. 3 is a flow diagram illustrating a second embodiment of a method for reducing the latencies in the publication of a message in a message publication system in accordance with the present invention. Like the method illustrated in FIG. 2, the method illustrated in FIG. 3 may be employed when the publishing component 110 and the receiving component 140 of at least one subscriber 150 reside within the same process space. In this embodiment, however, it is further assumed that the durability of the message does not have to be maintained. That is, the subscriber can afford to loose the message in the case of an exigency such as a process crash or system failure.

Referring to FIG. 3, the process begins at step 310 where the publishing component 110 receives a message from publisher 100 to be published to one or more subscribers. At step 320, the publishing component 110 accesses the subscription store 120 in order to determine the subscribers to which the message should be published. At step 330, the publishing component 110 forms a list of subscribers to which the message should be published. At step 340, in accordance with the invention, the publishing component determines, for each intended subscriber, whether the receiving component of each subscriber is in the same process space as the publishing component. If not, then at step 360, the message is pushed into the message queue 130 for that subscriber in the subscription store 120 in the conventional manner. The new message will be detected during the polling process performed by the receiving component, and ultimately will be delivered to the in-memory subscriber component. The message will then at some point be removed from the message queue in the conventional manner.

If, however, it is determined at step 340 that the receiving component is in the same process space, then at step 350 the message is delivered directly to the receiving component's data partition corresponding to the subscriber. For example, this can be achieved by passing the message to the receiving component via an inter-process communication mechanism or via a direct in-memory update. Again, it is understood that any mechanism for passing the message directly to the receiving component may be employed, and the present invention is by no means limited to any one mechanism. The receiving component then, at step 370, delivers the message to the in-memory subscriber component. Unlike the embodiment illustrated in FIG. 2, however, the message is not pushed into the message queue for the subscriber. Thus, the message is not preserved and is considered non-durable.

As can be appreciated, assuming that the publishing component and receiving component reside in the same process space, this embodiment avoids not only the latency Tp, but also the latencies Tq and Tc because the message is not stored in the message queue for the subscriber.

Figure 4:
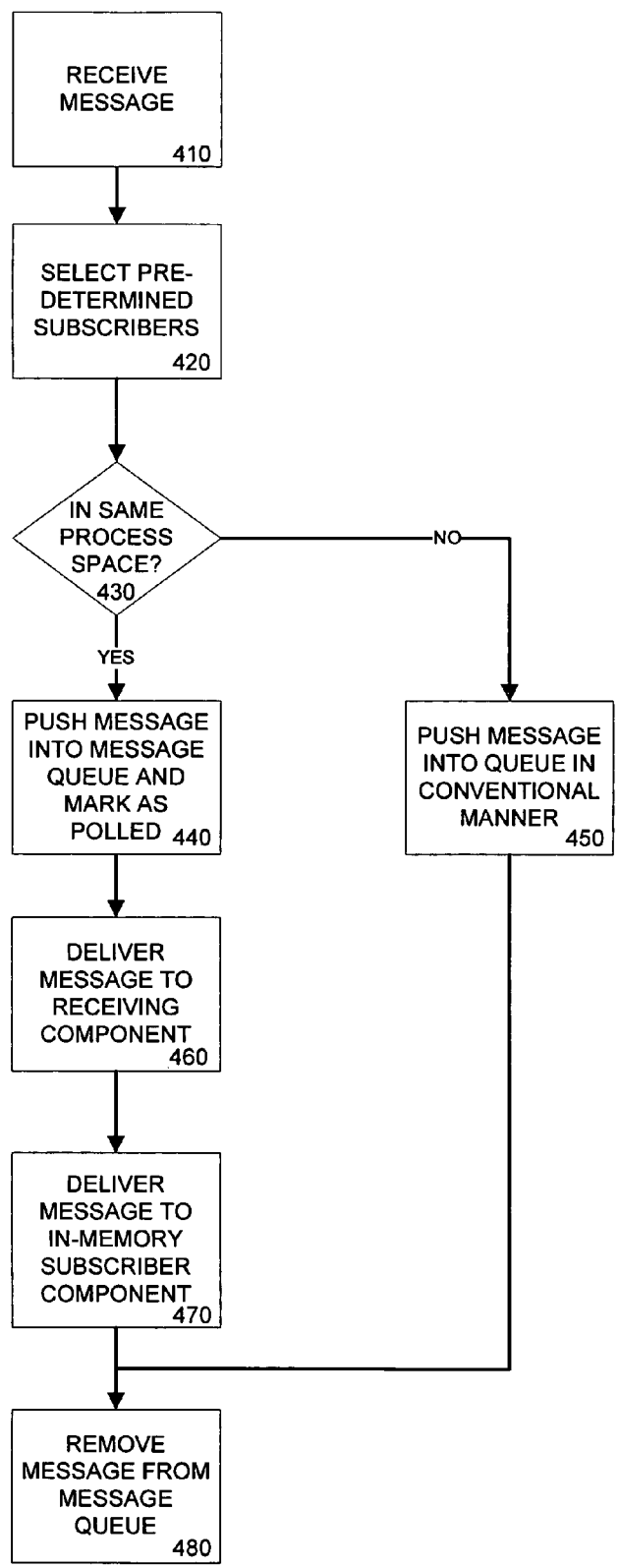
FIG. 4 is a flow diagram illustrating still another embodiment of a method for reducing latency in a publisher-subscriber model in accordance with the present invention.

FIG. 4 is a flow diagram of yet another embodiment of a method for reducing the latencies in the publication of a message in a message publication system in accordance with the present invention. This embodiment recognizes that further optimizations are possible where the identity of potential subscribers is known in advance by the publisher 100 or publishing component 110. The method illustrated in FIG. 4 is essentially a modification to the embodiment illustrated in FIG. 2, wherein the publisher knows the identity of a subscriber in advance.

Referring to FIG. 4, at step 410, the publishing component 110 receives a message from publisher 100 to be published to one or more subscribers. Unlike the prior embodiments, instead of accessing the subscription store to identify the subscribers to which the message should be published, that list of subscribers is already known. Accordingly, at step 420, the publishing component 110 selects one of the known subscribers. At step 430, in accordance with the invention, the publishing component determines whether the receiving component of the subscribet is in the same process space as the publishing component. If not, then at step 450, the message is pushed into the message queue 130 for that subscriber in the subscription store 120 in the conventional manner. The new message will be detected during the polling process performed by the subscription component, and ultimately will be delivered to the in-memory subscriber component.

If, however, it is determined at step 430 that the receiving component is in the same process space, then at step 440 the message is pushed into the corresponding message queue for the subscriber. But in this case, the message is marked in the queue as if it had already been discovered during the polling process of the receiving component, retrieved from the subscription and message store, and published to the subscriber (even though this has actually not occurred). Again, such marking is accomplished in whatever manner messages are normally marked as such in the message queues. Next, at step 460, the message is delivered directly to the receiving component's data partition corresponding to the subscriber. At step 470 the receiving component publishes the message to the in-memory subscriber component.

As can be appreciated, assuming that the publishing component and receiving component of the intended subscriber reside in the same process space, this method not only avoids the latency Tp but also the latency Te because the consultation with the subscription and message store in order to obtain a list of subscribers to receive the message is not necessary as the identity of subscribers is predetermined.

Whether the message is published in the conventional manner or via the more direct delivery method of the present invention, the message will eventually be removed from the message queue at step 480 in accordance with the conventional message clean-up process.

Figure 5:
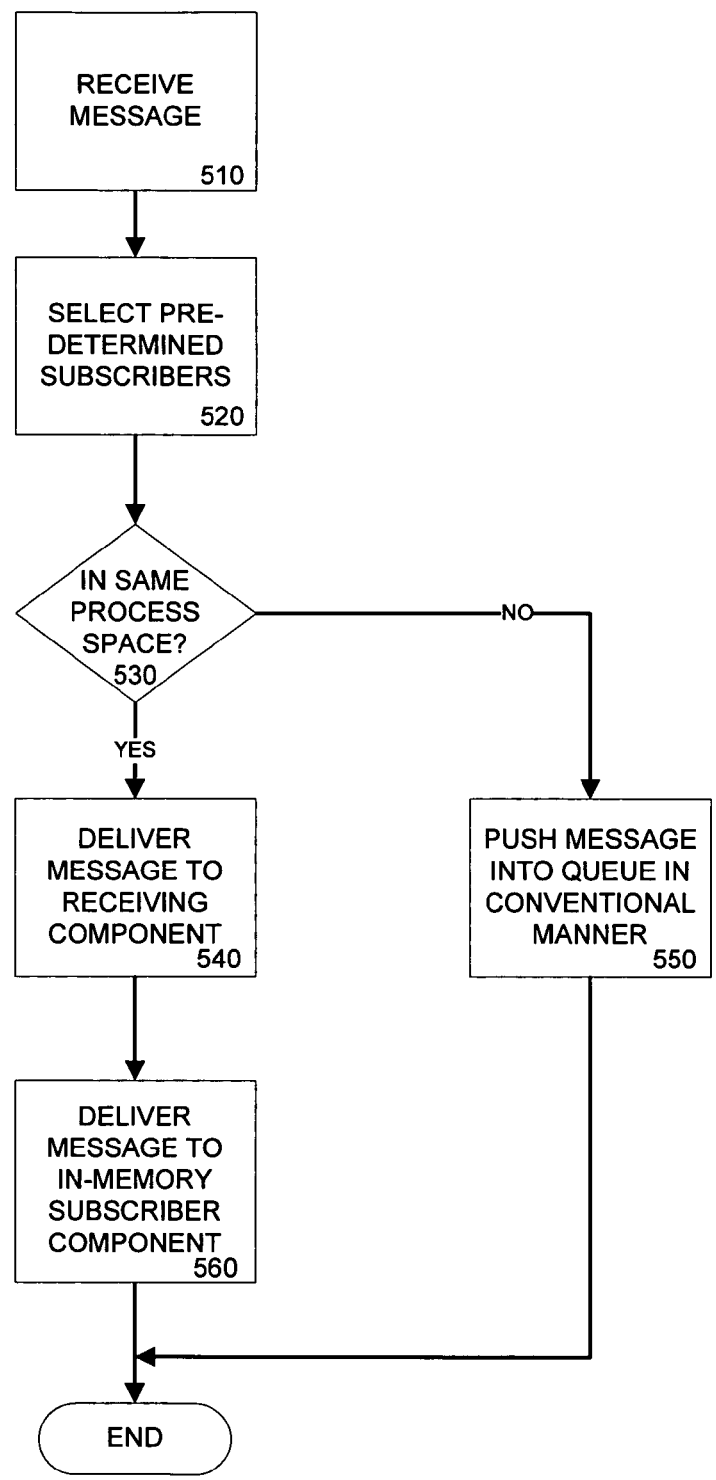
FIG. 5 is a flow diagram illustrating yet another embodiment of a method for reducing latency in a publisher-subscriber model in accordance with the present invention.

FIG. 5 is a flow diagram illustrating yet another embodiment of a method for reducing the latencies in the publication of a message in a message publication system in accordance with the present invention. This embodiment combines both of the "known subscriber" optimization discussed above in connection with the embodiment of FIG. 4 and the optimization of the embodiment of FIG. 3 where the durability of a message does not have to be maintained. The method illustrated in FIG. 5 is essentially a modification to the embodiment illustrated in FIG. 3, with the added "known subscriber" optimization.

Referring to FIG. 5, the process begins at step 510 where the publishing component 110 receives a message from publisher 100 to be published to one or more subscribers. At step 520, the publishing component 110 selects one of the predetermined subscribers. At step 530, in accordance with the invention, the publishing component determines whether the receiving component is in the same process space as the publishing component. If not, then at step 550, the message is pushed into the message queue 130 for that subscriber in the subscription store 120 in the conventional manner. The new message will be detected during the polling process performed by the subscription component, and ultimately will be published to the in-memory subscriber component. The message will then at some point be removed from the message queue in the conventional manner.

If, however, it is determined at step 530 that the receiving component is in the same process space, then at step 540 the message is delivered directly to the receiving component's data partition corresponding to the subscriber. At step 560, the message is delivered to the in-memory subscriber component. Unlike the embodiments illustrated in FIGS. 2 and 4, however, the message is not pushed into the message queue for the subscriber. Thus, the message is not preserved and is considered non-durable.

As can be appreciated, assuming that the publishing component and receiving component reside in the same process space, this embodiment avoids not only the latencies Tq, Tp, and Tc, but also the latency component Te.

Figure 6:
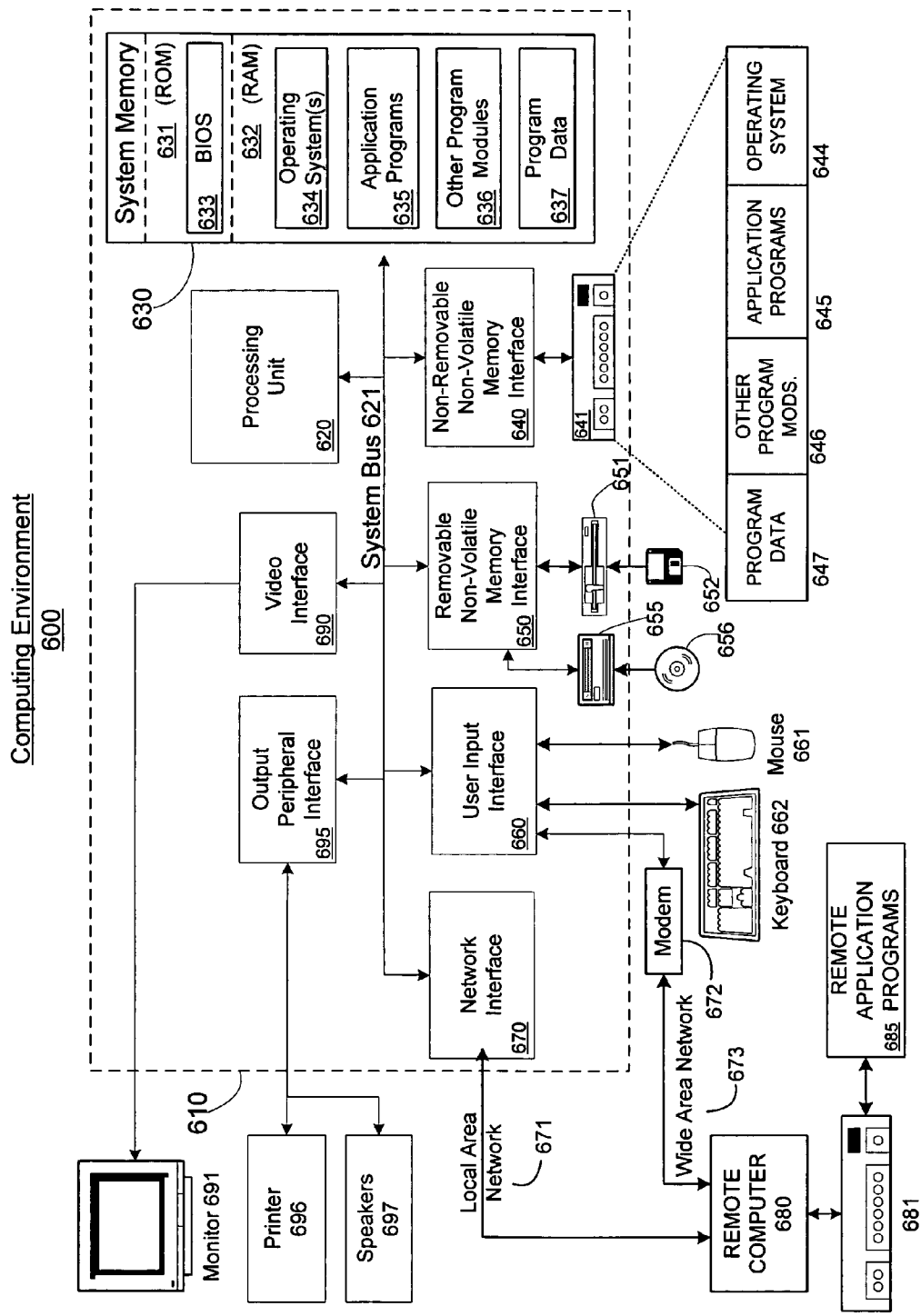
FIG. 6 is a block diagram representing an exemplary computing system in which the present invention may be implemented.

FIG. 6 illustrates the functional components of one example of a computing system 600 in which aspects of the present invention may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. The term "component" refers to program code and/or data in the form of routines, programs, objects, modules, data structures and the like that perform particular functions.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 630 includes computer storage media in the form of volatile and/or nonvolatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated, on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, discussed above and illustrated in FIG. 6, provide storage of computer readable instructions, data structures, components, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. In a message publication system comprising a publishing component, a subscription and message store, and one or more receiving components each associated with one or more subscribers, wherein the publishing component stores a message to be published in the subscription and message store and a receiving component may retrieve the message from the subscription and message store and publish it to one or more of the subscribers with which it is associated, a method for reducing the latency in publishing a message from the publisher to a subscriber comprising:

receiving the message to be published;
identifying a subscriber to which the message is to be published;
determining, for the identified subscriber, whether the receiving component associated with that subscriber is in the same process space as the publishing component, wherein components in the same process space communicate via intra-process communication or common data structure updates;
if the subscriber is in the same process space as the publishing component, transferring the message directly from the publishing component associated with the publisher to the receiving component associated with the subscriber through direct updates of in-memory data structures of the receiving component of the subscriber wherein the subscriber directly accesses the received message, without requiring the receiving component to retrieve the message from the subscription and message store; and
if the subscriber is not in the same process space as the publishing component, transferring the message into a message queue of the subscription and message store for that subscriber, detecting the message during a polling process performed by the receiving component, and publishing the message to an in-memory component of the subscriber.

2. The method recited in claim 1, wherein the subscription and message store comprises one or more message queues each associated with a respective one of the subscribers, the method further comprising:

storing the message in the message queue associated with the identified subscriber; and
if the receiving component associated with that subscriber is in the same process space as the publishing component, marking the message in the message queue as if the message had been retrieved from the message queue and published to the subscriber by the receiving component associated with the subscriber.

3. The method recited in claim 2, further comprising:
removing the message from the message queue after the message has been published to the subscriber.

4. The method recited in claim 2, wherein said step of marking the message in the message queue comprises setting a flag associated with the message in the message queue.

5. The method recited in claim 1, wherein said step of identifying the subscriber comprises determining from information stored in the subscription and message store to which subscribers the message is to be published.

6. The method recited in claim 1, wherein the subscribers to which the message is to be published are predetermined, and wherein said step of identifying the subscriber comprises selecting one of the predetermined subscribers.

7. The method recited in claim 1, further comprising transferring the message from the receiving component to an in-memory component of the subscriber.

8. A computer readable storage medium having program code stored therein for use in a computer system comprising a publishing component, a subscription and message store, and one or more receiving components each associated with one or more subscribers, wherein the publishing component stores a message to be published in the subscription and message store and a receiving component may retrieve the message from the subscription and message store and publish it to one or more of the subscribers with which it is associated, the program code, when executed, causing the system to perform the following steps:

receiving the message to be published;
identifying a subscriber to which the message is to be published;
determining, for the identified subscriber, whether the receiving component associated with that subscriber is in the same process space as the publishing component, wherein components in the same process space communicate via intra-process communication or common data structure updates;
if the subscriber is in the same process space as the publishing component, transferring the message directly from the publishing component associated with the publisher to the receiving component associated with the subscriber through direct updates of in-memory data structures of a receiving component of the subscriber wherein the subscriber directly accesses the received message, without requiring the receiving component to retrieve the message from the subscription and message store; and
if the subscriber is not in the same process space as the publishing component, transferring the message into a message queue of the subscription and message store for that subscriber, detecting the message during a polling process performed by the receiving component, and publishing the message to an in-memory component of the subscriber.

9. The computer readable storage medium recited in claim 8, wherein the subscription and message store comprises one or more message queues each associated with a respective one of the subscribers, wherein the program code, when executed, causes the system to further perform the following steps:

storing the message in the message queue associated with the identified subscriber; and
if the receiving component associated with that subscriber is in the same process space as the publishing component, marking the message in the message queue as if the message had been retrieved from the message queue and published to the subscriber by the receiving component associated with the subscriber.

10. The computer readable storage medium recited in claim 9, wherein the program code causes the system to further perform the following step:
removing the message from the message queue after the message has been published to the subscriber.

11. The computer readable storage medium recited in claim 9, wherein said step of marking the message in the message queue comprises setting a flag associated with the message in the message queue.

12. The computer readable storage medium recited in claim 8, wherein said step of identifying the subscriber comprises determining from information stored in the subscription and message store to which subscribers the message is to be published.

13. The computer readable storage medium recited in claim 8, wherein the subscribers to which the message is to be published are predetermined, and wherein said step of identifying the subscriber comprises selecting one of the predetermined subscribers.

14. The computer readable storage medium recited in claim 8, wherein the program code, when executed, causes the system to further perform the following step:
   transferring the message from the receiving component to an in-memory component of the subscriber.

15. A system implemented in a computer processor for reducing the latency in publishing a message from a publisher to a subscriber, the system comprising:
   a publishing component;
   a subscription and message store; and
   one or more receiving components each associated with one or more subscribers;
   wherein the publishing component:
      receives the message to be published,
      identifies the subscriber to which the message is to be published,
      determines, for the identified subscriber, whether the receiving component associated with that subscriber is in the same process space as the publishing component, wherein components in the same process space communicate via intra-process communication or common data structure updates,
      if the subscriber is in the same process space as the publishing component, transfers the message directly from the publishing component associated with the publisher to the receiving component associated with the subscriber through direct updates of in-memory data structures of a receiving component of the subscriber wherein the subscriber directly accesses the received message, without requiring the receiving component to retrieve the message from the subscription and message store, and
      if the subscriber is not in the same process space as the publishing component, transferring the message into a message queue of the subscription and message store for that subscriber, detecting the message during a polling process performed by the one or more receiving components, and publishing the message to an in-memory component of the subscriber.

16. The system recited in claim 15, wherein the subscription and message store comprises one or more message queues each associated with a respective one of the subscribers, wherein the publishing component stores the message in the message queue associated with the identified subscriber, and wherein if the receiving component associated with that subscriber is in the same process space as the publishing component, the message is marked in the message queue as if the message had been retrieved from the message queue and published to the subscriber by the receiving component associated with the subscriber.

17. The system recited in claim 16, wherein the message is removed from the message queue after the message has been published to the subscriber.

18. The system recited in claim 15, wherein the publishing component's identification of the subscriber comprises determining from information stored in the subscription and message store to which subscribers the message is to be published.

19. The system recited in claim 15, wherein the subscribers to which the message is to be published are predetermined, and wherein the publishing component's identification of the subscriber comprises selecting one of the predetermined subscribers.

20. The system recited in claim 15, wherein the receiving component transfers the message to an in-memory component of the subscriber.

\* \* \* \* \*